United States Patent
Shiokawa

(10) Patent No.: US 8,941,612 B2
(45) Date of Patent: Jan. 27, 2015

(54) INPUT DISPLAY APPARATUS, TANGIBLE COMPUTER-READABLE RECORDING MEDIUM AND INPUT DISPLAY METHOD

(71) Applicant: Yukiharu Shiokawa, Hachioji (JP)

(72) Inventor: Yukiharu Shiokawa, Hachioji (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 122 days.

(21) Appl. No.: 13/674,332

(22) Filed: Nov. 12, 2012

(65) Prior Publication Data

US 2013/0135191 A1 May 30, 2013

(30) Foreign Application Priority Data

Nov. 24, 2011 (JP) ................. 2011-256845

(51) Int. Cl.
G06F 3/041 (2006.01)
G06F 3/01 (2006.01)
G06F 3/0488 (2013.01)

(52) U.S. Cl.
CPC ............... *G06F 3/017* (2013.01); *G06F 3/018* (2013.01); *G06F 3/041* (2013.01); *G06F 3/0416* (2013.01); *G06F 3/04883* (2013.01)
USPC ........................................ 345/173

(58) Field of Classification Search
None
See application file for complete search history.

(56) References Cited

U.S. PATENT DOCUMENTS

| 5,995,081 A | 11/1999 | Kato |
| 2008/0211833 A1 | 9/2008 | Inoue |
| 2010/0156784 A1 | 6/2010 | Narusawa |
| 2010/0156853 A1 | 6/2010 | Narusawa |
| 2011/0221730 A1* | 9/2011 | Nishizawa .................... 345/211 |
| 2013/0100103 A1* | 4/2013 | Lai et al. ...................... 345/211 |

FOREIGN PATENT DOCUMENTS

| JP | 8-212306 A | 8/1996 |
| JP | 9-190275 A | 7/1997 |
| JP | 2000-305707 A | 11/2000 |
| JP | 2008-209893 A | 9/2008 |
| JP | 2010-140295 A | 6/2010 |
| JP | 2010-146266 A | 7/2010 |
| JP | 2010-146267 A | 7/2010 |

OTHER PUBLICATIONS

Office Action (Notice of Reason for Refusal) issued Oct. 22, 2013, by the Japanese Patent Office in corresponding Japanese Patent Application No. 2011-256845, and an English Translation of the Office Action. (8 pages).

* cited by examiner

*Primary Examiner* — Adam R Giesy
(74) *Attorney, Agent, or Firm* — Buchanan Ingersoll & Rooney P.C.

(57) ABSTRACT

Disclosed is an input display apparatus including: a handwriting input unit to receive a handwriting input; a particle migration type of display unit to enable display contents to be partially rewritten; and a control unit to control a display operation of the display unit, for displaying each stroke which is input via the handwriting input unit; wherein the control unit controls the display unit so as to display a currently input stroke which is currently input via the handwriting input unit, in a simple display in which a delay required to display the currently input stroke is short as compared with a normal display.

21 Claims, 10 Drawing Sheets

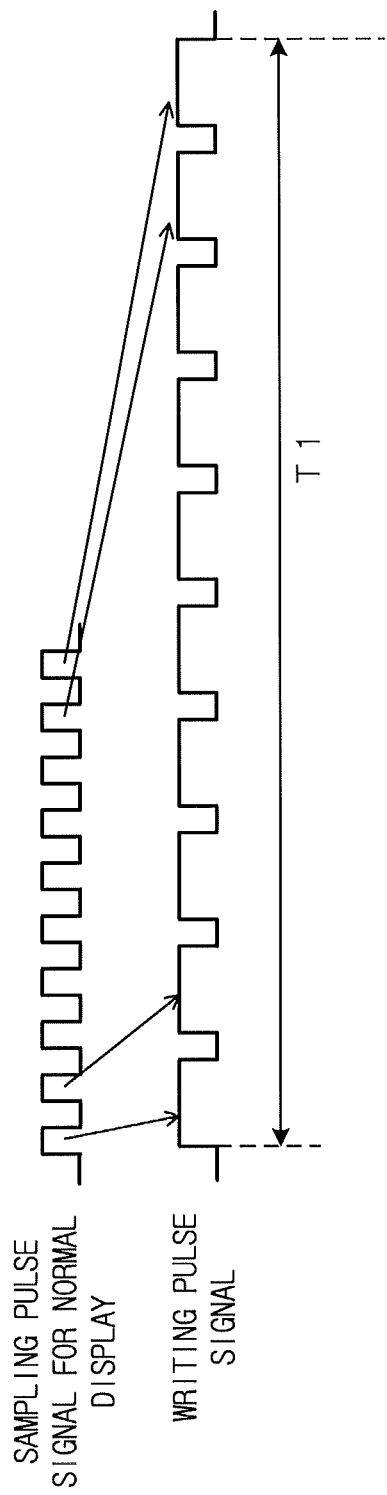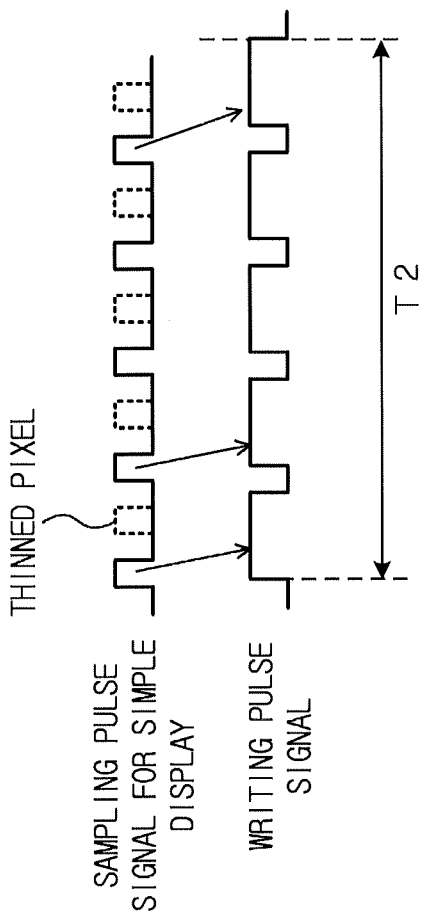

FIG.4A
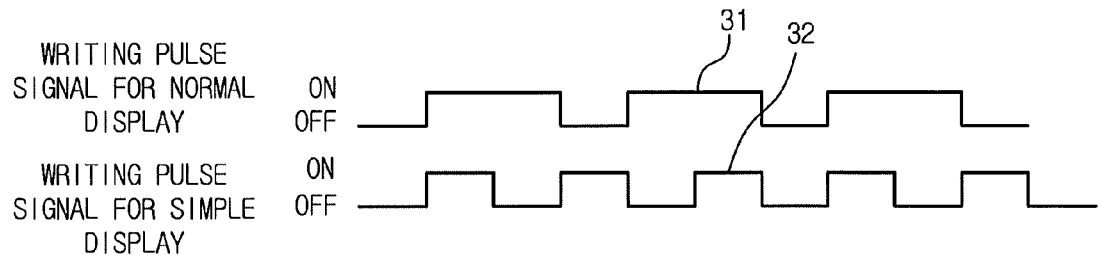
WRITING PULSE SIGNAL FOR NORMAL DISPLAY
WRITING PULSE SIGNAL FOR SIMPLE DISPLAY
FIG.4B
NORMAL DISPLAY
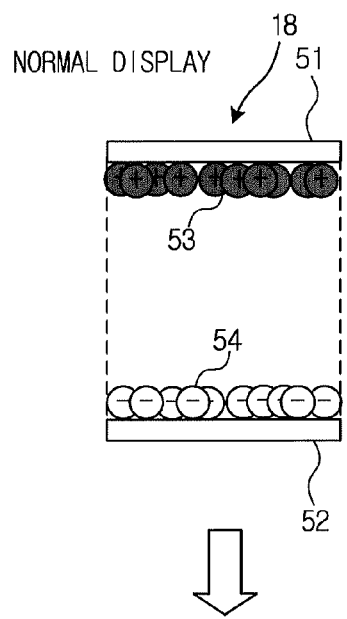
FIG.4C
SIMPLE DISPLAY
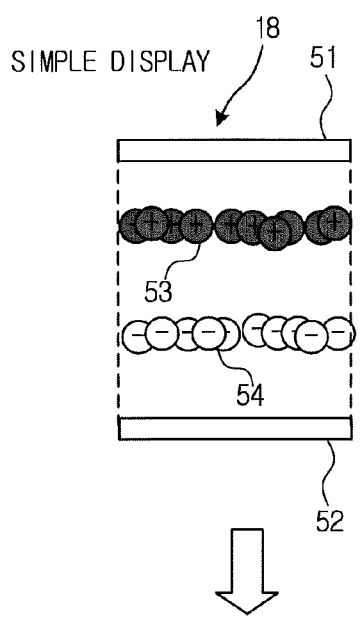

FIG.10A
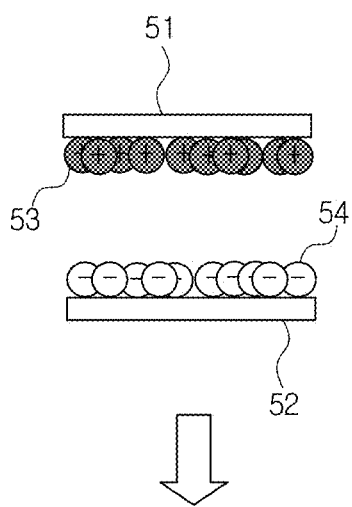
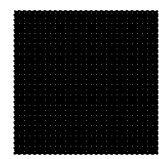
Prior Art
FIG.10B
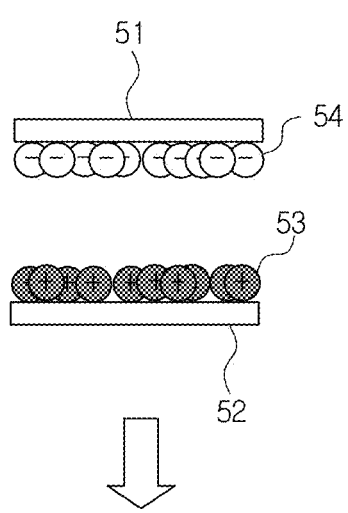
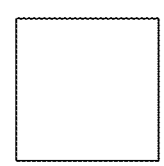
Prior Art

INPUT DISPLAY APPARATUS, TANGIBLE COMPUTER-READABLE RECORDING MEDIUM AND INPUT DISPLAY METHOD

BACKGROUND OF THE INVENTION

1. Field of the Invention

The present invention relates to an input display apparatus, a tangible computer-readable recording medium and an input display method, for displaying input contents by receiving a handwriting input of a character, a figure or the like.

2. Description of Related Art

In recent years, various types of display devices (so-called "electronic paper") in which when the voltage is applied only at the rewriting of the display contents, the display contents are held and continuously displayed also after the application of the voltage is stopped, have been developed.

FIGS. 10A and 10B show an example of the structure of the electronic paper. The black electronic powder 53 which is positively charged and the white electronic powder 54 which is negatively charged are sealed between the front panel 51 which is composed of a transparent electrode and the rear electrode plate 52. In the area in which the potential of the front panel 51 is higher than that of the rear electrode plate 52, the white electronic powder 54 is migrated to the front panel 51 and the white is displayed (See FIG. 10B). In the area in which the potential of the front panel 51 is lower than that of the rear electrode plate 52, the black electronic powder 53 is migrated to the front panel 51 and the black is displayed (See FIG. 10A). As described above, the method in which the electronic powder (particles) is migrated, is called as the particle migration method or the electrophoresis method.

The electronic paper having such a structure has the advantage in which the electric power is not consumed when the display contents are not written. On the other hand, there is a problem in which it takes comparatively long time to rewrite the display contents. Some methods for solving the above problem have been proposed.

For example, in general, the black particles or the white particles are migrated until the electronic paper is in a saturated condition and the black or the white is clearly displayed. On the other hand, the technology for shortening the time for changing the color between the black and the white by the gray level drive for migrating the particles until the electronic paper is in a gray level condition in which the difference in display color can be recognized, has been proposed (See Japanese Patent Application Publication No. 2008-209893).

In Japanese Patent Application Publication No. 8-212306, the following technology is disclosed. The thinning of handwriting data for displaying the handwriting is carried out so as to maintain the original shape of the handwriting and to minimize the data size of the handwriting data. Then, the thinned handwriting data is stored. In Japanese Patent Application Publication No. 9-190275, the following technology is disclosed. The sequence of coordinate points is received from the input unit and a new sequence of coordinate points is predictively inserted between the adjacent coordinate points in order to output the sequence of coordinate points, which forms a smooth handwritten curve. Then, the handwriting data is displayed.

In case that a touch panel for receiving the handwriting input is provided on the surface of the electronic paper and the handwritten contents are displayed on the electronic paper, because of the above problem relating to the time for changing the color, the speed of changing the color on the electronic paper is lower than the input speed of the handwriting. As a result, the stroke of the handwriting using a pen or the like is too slowly displayed with a black line. Therefore, during the handwriting input, it was necessary for a user to carry out the handwriting for inputting the next stoke by predicting how the previous stroke of the handwriting is displayed in consideration of the situation that the handwriting for inputting the previous stroke is carried out but the previous stroke of the handwriting has not been displayed. Further, because the response speed for displaying the handwriting is slow, the user cannot grasp the balance of the whole input contents during the handwriting input for a character, a figure or the like. As a result, the user cannot carry out the handwriting of a character, a figure or the like as intended. Further, in case that the user wants to carry out the handwriting with confirming the balance of the whole input contents, there is a problem in which it is required to carry out the handwriting slowly in consideration of the display performance of the electronic paper.

When the stroke of the handwriting is lightly displayed during the handwriting input by the gray level drive using the technology disclosed in Japanese Patent Application Publication No. 2008-209893, the response time for displaying the handwriting can be shortened. However, only by the gray level drive, it is not possible to sufficiently respond to the quick handwriting.

SUMMARY

To achieve at least one of the abovementioned objects, an input display apparatus reflecting one aspect of the present invention comprises:

a handwriting input unit to receive a handwriting input;

a particle migration type of display unit to enable display contents to be partially rewritten; and a control unit to control a display operation of the display unit, for displaying each stroke which is input via the handwriting input unit;

wherein the control unit controls the display unit so as to display a currently input stroke which is currently input via the handwriting input unit, in a simple display in which a delay required to display the currently input stroke is short as compared with a normal display.

Preferably, after the currently input stroke is displayed in the simple display, the control unit changes the simple display to the normal display.

Preferably, in the simple display, the control unit controls the display unit so as to display the currently input stroke by thinning display data of the currently input stroke.

Preferably, the control unit controls the display unit so as to display the currently input stroke without thinning an initial pixel of the currently input stroke.

Preferably, the control unit increases a thinning rate in proportion as a change rate of a direction of the currently input stroke is small.

Preferably, the control unit increases a thinning rate so as not to exceed a predetermined upper limit of the thinning rate, in proportion as an input speed of the currently input stroke is high.

Preferably, in the simple display, in case that a line width of the currently input stroke is not less than the predetermined number of pixels, the control unit controls the display unit so as to display the currently input stroke by narrowing the line width of the currently input stroke.

Preferably, in the simple display, the control unit controls the display unit so as to display the currently input stroke which is currently input in color, in monochrome.

Preferably, in the simple display, the control unit controls the display unit so as to display the currently input stroke which is currently input via the handwriting input unit, at a low density as compared with the normal display.

Preferably, the display data of the currently input stroke is thinned by changing a sampling cycle at positions of the handwriting input.

BRIEF DESCRIPTION OF THE DRAWINGS

The present invention will become more fully understood from the detailed description given hereinafter and the accompanying drawings given by way of illustration only, and thus are not intended as a definition of the limits of the present invention, and wherein:

FIGS. 3A and 3B are explanatory views showing the relation between the thinning and the shortening of the display time;

FIGS. 4A to 4C are explanatory views the relation among the pulse width of the writing pulse signal, the migration of the particles and the display color;

FIGS. 10A and 10B are explanatory views showing the structure of the electronic paper.

DETAILED DESCRIPTION OF PREFERRED EMBODIMENT

Hereinafter, a preferred embodiment of the present invention will be explained with reference to the accompanying drawings.

Figure 1:
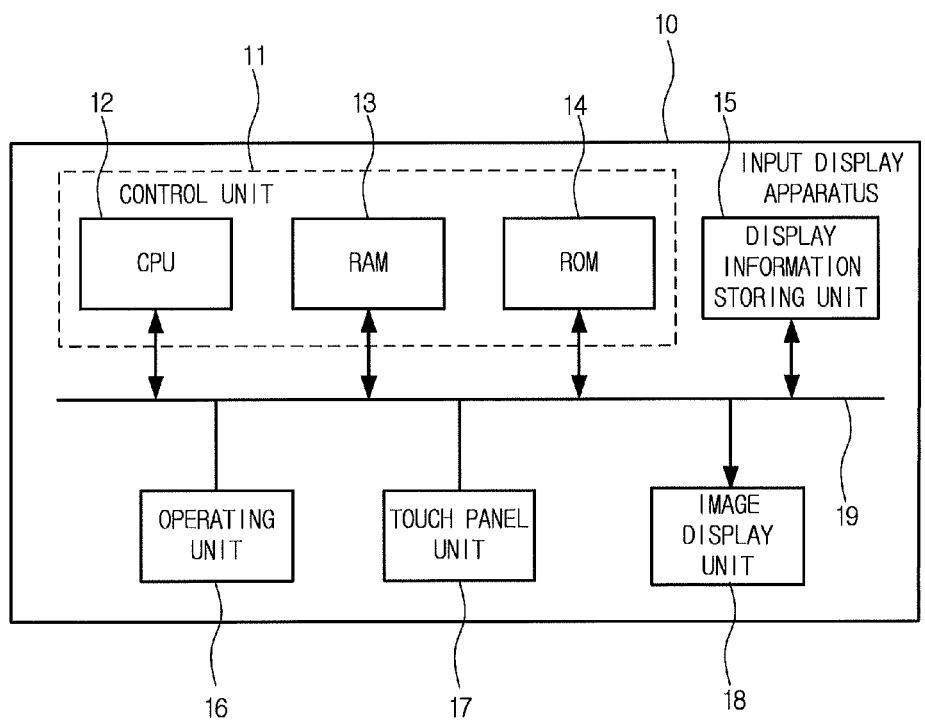
FIG. 1 is a block diagram showing a schematic configuration of the input display apparatus according to the embodiment.

FIG. 1 shows the schematic configuration of the input display apparatus 10 according to the embodiment.

The input display apparatus 10 comprises a control unit 11, a display information storing unit 15, an operating unit 16, a touch panel unit 17 and an image display unit 18 which are connected with each other via a system bus 19. The control unit 11 comprises a CPU (Central Processing Unit) 12, a RAM (Random Access Memory) 13, a ROM (Read Only Memory) 14 and the like.

In the ROM 14 of the control unit 11, a start-up program, various programs and data are stored. The control unit 11 loads the program stored in the ROM 14 to the RAM 13. By executing various processings in accordance with the loaded program, various functions of the input display apparatus 10 are realized. The RAM 13 is used as a load area for the program and a work area for temporarily storing various data when the CPU 12 executes the program.

In the display information storing unit 15, an image data, display information which is displayed on the image display unit 18, and the like are stored.

The operating unit 16 comprises switches for receiving various operations and inputs from a user, and outputs a signal corresponding to the received operation or input from the user, to the CPU 12 of the control unit 11.

The image display unit 18 displays an image in accordance with the image data by the instruction of the CPU 12 of the control unit 11. The image display unit 18 comprises a particle migration type of the electronic paper, which is the same as that of FIGS. 10A and 10B. The image display unit 18 can display a color image by using a color filter. In the image display unit 18, pixels are arranged in a matrix form having a rectangular shape. That is, the image display unit 18 is a dot matrix type of display device.

The rewriting method of the image display unit 18 includes a method for rewriting one line of pixels by one pulse once, and a method for rewriting only one pixel by one pulse. When only a part of the image is rewritten, in case of the method for rewriting one line of pixels by one pulse, only the lines having pixels to be rewritten are selectively rewritten. In the method for rewriting only one pixel, only the pixels to be rewritten are selectively rewritten.

The input display apparatus 10 can display the image in accordance with not only the image data obtained by the handwriting input via the touch panel unit 17 but also the image data input from an external device. The mode for inputting the image data via the touch panel unit 17 is referred to as "handwriting input mode".

Figure 2:
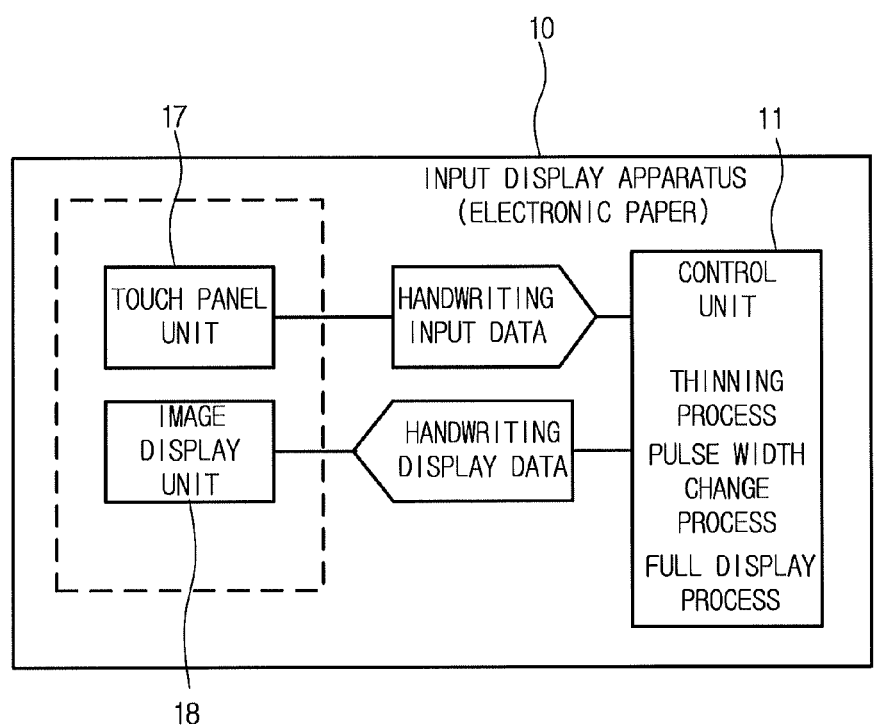
FIG. 2 is an explanatory view showing the data flow in the handwriting mode of the input display apparatus according to the embodiment.

FIG. 2 shows the data flow since the input display apparatus 10 receives the input of the stroke of the handwriting in the handwriting input mode via the touch panel unit 17 until the input display apparatus 10 displays the handwritten contents on the image display unit 18. The handwriting input data input via the touch panel unit 17 is processed by the control unit 11 to prepare the handwriting display data by the thinning process, the pulse width change process, the full display process and the like. The handwriting display data is transmitted to the image display unit 18. The image display unit 18 rewrites the display contents in accordance with the handwriting display data.

The control unit 11 instructs the image display unit 18 to tentatively display the stroke of the handwriting, which is currently input via the touch panel unit 17 in the simple display in which the handwriting display data is thinned or the density of the handwriting display data is lower than usual. In the embodiment, the simple display is carried out by thinning the data, by displaying the data at a low density, by displaying the data so as to narrow the line width of the bold line, by carrying out the monochrome display of the color handwriting, or the like. Thereby, the response time which elapses since the handwriting input is carried out until the handwriting display data is displayed on the image display unit 18 is shortened. The handwriting display data is displayed so as to respond to the handwriting input as quickly as possible. Then, the changing operation (full display process) for changing the simple display for simply displaying the stroke to the normal display for normally displaying the stroke, is carried out. For example, in case of the simple display in which the display data is thinned, the data is displayed without thinning the data. Further, in case of the simple display in which the display data is thinned and is displayed at a low density, the data is displayed at the normal density without thinning the data.

Even in the simple display in which the data is thinned or is displayed at the low density, the shape of the stroke of the handwriting can be basically recognized. Therefore, by displaying the stroke which is currently input in handwriting in the simple display, the user can carry out the handwriting while the user immediately recognizes the handwritten contents input by the user in the simple display in which the delay required to display the handwriting display data is short.

FIGS. 3A and 3B show the situation in which the required time for displaying the stroke is shortened by thinning the data. In FIG. 3A, the case in which one stroke is displayed without thinning the data, is shown. In FIG. 3B, the case in which the stroke which is the same as that of FIG. 3A is displayed by thinning the data at the thinning rate of 50%, is shown. The pulse parts shown by dashed lines in FIG. 3B correspond to the thinned pixels. In case of FIG. 3A, because the stroke is drawn by using 10 pixels, the required writing time is T1 which corresponds to 10 pulses of the writing pulse signal. In case of FIG. 3B, because the same stroke is drawn by using 5 pixels which are arranged on alternate pixels, the stroke can be written by using the 5 pulses of the writing pulse signal. The required writing time for the stroke of FIG. 3B becomes T2 which is approximately half of T1.

In case of the apparatus in which the data can be partially rewritten pixel by pixel (or line by line), the number of pixels to be rewritten (the number of lines to be rewritten) is reduced by thinning the data. As a result, the time for applying the pulses of the writing pulse signal and the required time for transmitting the writing data are shortened. The delay which is required to display the stroke so as to visually recognize the stroke becomes short, and the response speed for displaying the stroke becomes high. The thinning may be carried out by changing the sampling cycle when the touch panel unit 17 detects the position of the handwriting. For example, when the sampling cycle is lengthened twice, the number of samplings per unit of time becomes ½. Therefore, it is possible to thin the data by ½ as compared with the normal sampling cycle.

FIGS. 4A to 4C show the situation in which the required time for displaying the stroke is shortened by changing the pulse width of the writing pulse signal. FIG. 4A shows the writing pulse signal 31 for the normal display and the writing pulse signal 32 for the simple display so as to compare them with each other. The ON time period (voltage applying time) of the writing pulse signal 32 for the simple display is approximately half of the ON time period of the writing pulse signal 31 for the normal display.

FIG. 4B shows the state of the particles in the image display unit 18, which is caused when the pulses of the writing pulse signal 31 for the normal display are applied, and the display color (black). FIG. 4C shows the state of the particles in the image display unit 18, which is caused when the pulses of the writing pulse signal 32 for the simple display are applied, and the display color (gray). The numeral references which are attached to the elements shown in FIGS. 4B and 4C are the same as those of the same elements in the structure of the electronic paper shown in FIGS. 10A and 10B.

When the pulses of the writing pulse signal 31 for the normal display are applied, the black electronic powder 53 and the white electronic powder 54 are migrated until the electronic paper is in the saturated condition in the image display unit 18 (each electronic powder reaches the front panel 51 or the rear electrode plate 52). As a result, the display color is black as shown in FIG. 4B. On the other hand, when the pulses of the writing pulse signal 32 for the simple display are applied, because the voltage applying time is short, the black electronic powder 53 and the white electronic powder 54 are migrated only partway. Therefore, the density of the displayed stroke is low (the contrast is low) as shown in FIG. 4C. As a result, the display color is gray as shown in FIG. 4C. However, because the required time for rewriting the displayed data is shortened in proportion as the pulse width of the writing pulse signal is short, the delay which is required to display the data input in handwriting is short. As a result, it is possible to reduce the user's burden relating to the handwriting input.

Figure 5:
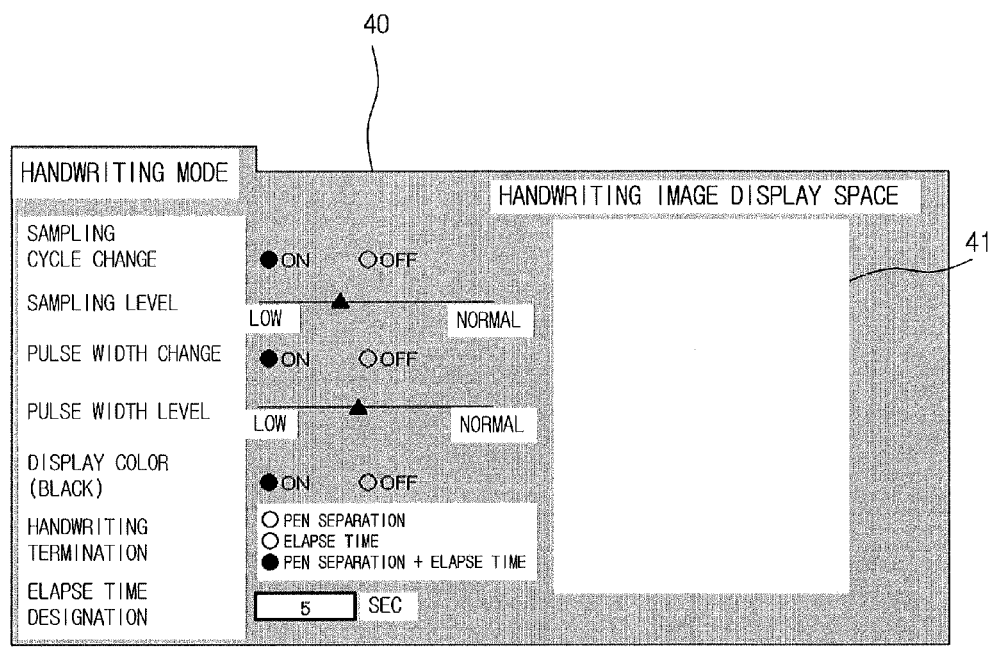
FIG. 5 is a plan view showing an example of the handwriting mode setting window of the input display apparatus according to the embodiment.

FIG. 5 shows an example of the handwriting mode setting window 40 for setting various items relating to the simple display for the handwriting input. The following settings for the handwriting input can be carried out.

(1) Sampling Cycle Change Setting

This setting is carried out by selecting ON or OFF.

When the sampling cycle change is ON, the data is thinned in accordance with the sampling level setting.

When the sampling cycle change is OFF, the sampling is carried out like the normal mode (the thinning of the data is not carried out).

(2) Sampling Level (Thinning Rate) Setting

In the sampling level setting, the thinning rate is set to an optional value between "Low" and "Normal". Only when the sampling cycle change is ON in the above item (1), the sampling level setting is effective.

(3) Pulse Width Change Setting

This setting is carried out by selecting ON or OFF.

When the pulse width change is ON, the data is rewritten in accordance with the writing pulse signal having the pulse width which is set by the pulse width level, and the rewritten data is displayed.

When the pulse width change is OFF, the data is rewritten in accordance with the writing pulse signal having the pulse width which is the same as the pulse width in the normal display, and the rewritten data is displayed.

(4) Pulse Width Level Setting

By determining the voltage applying time of the writing pulse signal, the density (contrast) of the displayed data is set. The pulse width level (voltage applying time) is set to an optional value between "Low" and "Normal". Only when the pulse width change is ON in the above item (3), the pulse width level setting is effective.

(5) Display Color (Black) Setting

This setting is carried out by selecting ON or OFF.

When the display color (black) setting is ON, the color data is changed to the black data regardless of the color of the handwriting input data. That is, even though the handwriting input of the color data is carried out, the handwriting data is displayed in monochrome.

When the display color (black) setting is OFF, the data is displayed by using the color which is the same as the color of the handwriting input data. That is, incase of the colored handwriting input data, this data is displayed by using the color of the handwriting input data.

(6) Handwriting Termination Setting

When at least one of the above items (1), (3) and (5) is ON, this setting is effective. In this setting, the start timing for starting the operation for changing the simple display for simply displaying the stroke to the normal display, is determined. Specifically, any one of "pen separation", "elapse time" and "pen separation+elapse time" is selected.

Pen separation: When a pen is separated from the touch panel unit 17, the operation for changing the simple display to the normal display, is started.

Elapse time: When the designated time elapses from the start of the handwriting, the operation for changing the simple display to the normal display, is started.

Pen separation+elapse time: The operation for changing the simple display to the normal display is started at the time at which a pen is separated from the touch panel unit 17 or the time at which the designated time elapses from the start of the handwriting, whichever is the earlier.

(7) Elapse Time Designation

When the "elapse time" or the "pen separation+elapse time" is selected in the handwriting termination setting of the above item (6), the elapse time designation is effective. The elapse time which elapses from the start of the handwriting until the start of the operation for changing the simple display to the normal display, is set on the second time scale.

In addition, in the handwriting mode setting window 40, the handwriting image display space 41 for carrying out the attempt of the handwriting, is provided. When the handwriting input is carried out for the handwriting image display space 41, the simple display and the operation for changing the simple display to the normal display are carried out in accordance with each of the setting values which are set via the handwriting mode setting window 40. As a result, it is possible to confirm the operation (the amount of the thinning, the display speed, the density and the like) in the handwriting input mode.

In the embodiment, the thinning rate is automatically changed in accordance with the change rate of the direction and the input speed of the stroke which is currently input in handwriting. For example, the change rate of the direction of the stroke is 0 when the stroke is a straight line (because the straight line is extended in the same direction). In case of a circle, because the direction of the stroke is changed at the same rate in the same direction, the change rate of the direction is also 0. As described above, in case of the straight line or the circle in which the change rate of the direction is small, even though the data is thinned at a high thinning rate, the user can easily estimate the position of the thinned pixel and can interpolate the pixels. On the other hand, in case a waved stroke, a free curve line and the like, the direction of the stroke is always changed. Further, the change rate of the direction is large near inflection points. In case of a curve in which the change rate of the direction is large, when the data is thinned at a high thinning rate, it is difficult for the user to correctly estimate the track of the stroke at the thinned pixels and to interpolate the pixels. As a result, the shape of the stroke cannot be accurately recognized. Therefore, in case that the change rate of the direction of the stroke is small, the thinning rate is increased. On the other hand, in case that the change rate of the direction of the stroke is large, the thinning rate is decreased.

Further, the amount of the change in the handwriting data (the movement speed of a pen), which is caused by the time course of the handwriting data, is calculated from the coordinate information. Then, in case that the movement speed of a pen used for carrying out the handwriting input is high, by increasing the thinning rate, the speed of the display of the handwriting data is adjusted to the handwriting speed as much as possible. However, when the thinning rate is too high, it is difficult to recognize the shape of the track of the stroke. Therefore, the upper limit of the thinning rate is set, and the thinning rate is increased in accordance with the movement speed of a pen so as not to exceed the above upper limit.

Figure 6:
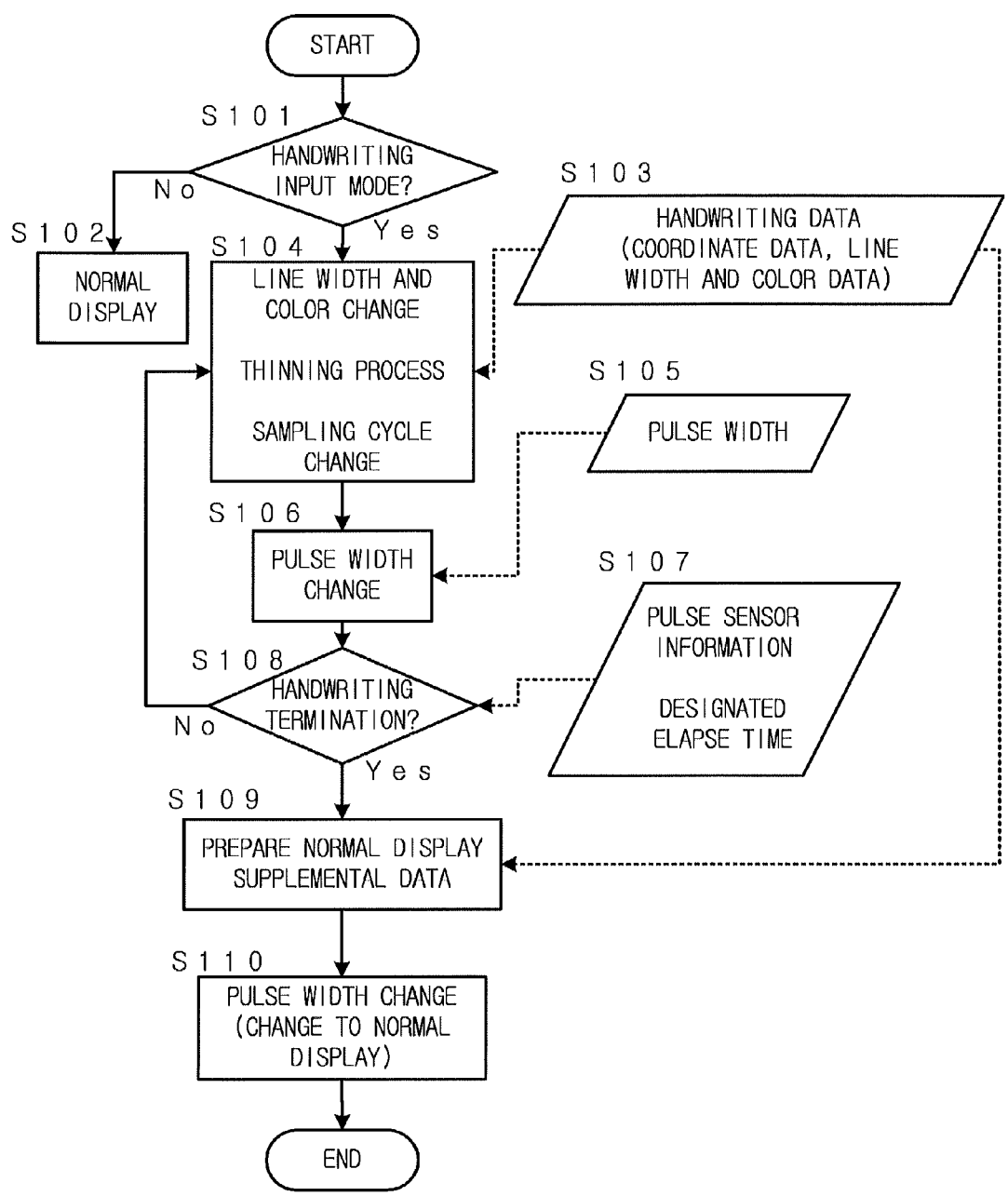
FIG. 6 is a flowchart showing the operation of the input display apparatus according to the embodiment, which is carried out during the handwriting input.

FIG. 6 is the flowchart which schematically shows the input display operation in the input display apparatus 10. The control unit 11 of the input display apparatus 10 judges whether the current input mode is the handwriting input mode or not (Step S101). When the current input mode is not the handwriting input mode (Step S101; No), the input display apparatus 10 carries out the normal display (Step S102).

When the current input mode is the handwriting input mode (Step S101; Yes), the simple display for simply displaying each stroke and the operation for changing the simple display to the normal display are carried out in accordance with the setting values which are set via the handwriting mode setting window 40. When the user carries out the handwriting input for the touch panel unit 17, the handwriting data indicating the coordinate data of the position of the handwriting input, the line width, the color and the like is output from the touch panel unit 17 and is input to the control unit 11 (Step S103).

The control unit 11 holds the input handwriting data in the display information storing unit 15. Further, the control unit 11 copies the handwriting data and carries out the process for displaying the copied handwriting data in the simple display, such as the line width change, the color change, the thinning process, the sampling cycle change and the like, in accordance with the setting values which are set via the handwriting mode setting window 40 (Step S104). Further, in case that the pulse width change is set to ON via the handwriting mode setting window 40, the control unit 11 fetches the set pulse width level and sets the pulse width of the writing pulse signal in accordance with the set pulse width level (Step S106). Then, the control unit 11 writes the handwriting data (the contents to be displayed in the simple display) which is processed in Step S104, by using the writing pulse signal having the pulse width set in Step S106, and rewrites the display contents of the image display unit 18. The pixel arranged in the start position of the stroke (the initial pixel of the stroke) is not thinned.

Next, the control unit 11 judges whether the handwriting for inputting the current stroke, is terminated or not (Step S108). In detail, the control unit 11 fetches the conditions for judging the handwriting termination ("pen separation", "elapse time", or "pen separation+elapse time" and the designated elapse time, if necessary), which are set via the handwriting mode setting window 40 (Step S107), and judges that the handwriting is terminated in case that the above conditions are satisfied (Step S108). When the handwriting is not terminated (Step S108; No), the process returns to Step S104. Then, the touch panel unit 17 continuously receives the input of the stroke and the control unit 11 carries out the simple display for simply displaying the input stroke.

When the control unit 11 judges that the handwriting for inputting the current stroke is terminated (Step S108; Yes), the control unit 11 carries out the operation for changing the simple display for simply displaying the stroke to the normal display (Step S109 and Step S110). In detail, the control unit 11 reads out the original handwriting data for the stroke, which is held in the display information storing unit 15, and fetches the information relating to the designation of the line width, the color and the like (Step S103). Then, the control unit 11 prepares the normal display supplemental data indicating the difference between the data which is currently displayed in the simple display and the data to be displayed in the normal display. This difference (normal display supplemental data) indicates the rewriting contents which is necessary to change the simple display to the normal display. For example, in case that the stroke is displayed in the simple display so as to thin the data, the thinned pixels are the above difference (normal display supplemental data). The rewritten pixels which are not thinned in the simple display are not included in the normal display supplemental data.

In case of the simple display in which the bold line is displayed so as to narrow the line width of the bold line, the part of the bold line other than the line part displayed in the simple display is the difference (normal display supplemental data).

Further, in case that the pulse width is shortened in the simple display, the difference between the pulse width of the writing pulse signal used in the normal display and the pulse width of the writing pulse signal used in the simple display is set as the pulse width of the writing pulse signal used in the operation for changing the simple display to the normal display. That is, because the voltage has been applied in the simple display until the image display unit 18 is in the state shown in FIG. 4C, the voltage may be applied enough to change the state of the image display unit 18 from the state shown in FIG. 4C to the saturated state shown in FIG. 4B.

According to the above explanation, the pixels are displayed as follows:

(1) The pixels which are not displayed in the simple display, are written in accordance with the writing pulse signal 31 for the normal display.

(2) The pixels written in the simple display in accordance with the writing pulse signal 32 for the simple display, which has a shorter pulse width, are rewritten in accordance with writing pulse signal having the pulse width corresponding to the above difference.

(3) The pixels written in the simple display in accordance with the writing pulse signal 31 for the normal display are not included in the normal display supplemental data.

In case that the color data is displayed in monochrome in the simple display, when the color data is displayed in the normal display, the rewriting of the color data is carried out by deleting the data displayed in monochrome in the simple display. Further, after the handwriting for inputting the stroke is terminated, the operation for changing the simple display for simply displaying this stroke to the normal display is started. In case that the handwriting for inputting the next stroke is started before the above operation for changing the simple display is finished, the above operation is temporarily stopped and the simple display for simply displaying the next stroke is preferentially carried out.

Next, examples of the change in the display state during the handwriting input in the handwriting input mode of the input display apparatus 10, will be explained.

FIGS. 7A to 7E show an example of the change in the display state in case that the handwriting input is carried out when the input display apparatus 10 is set so as to carry out the thinning and so as not to carry out the pulse width change. The handwriting termination setting is set to the pen separation. In this example, the data is partially rewritten pixel by pixel. The Chinese character "木" which means "tree" is input in handwriting.

Figure 7A:
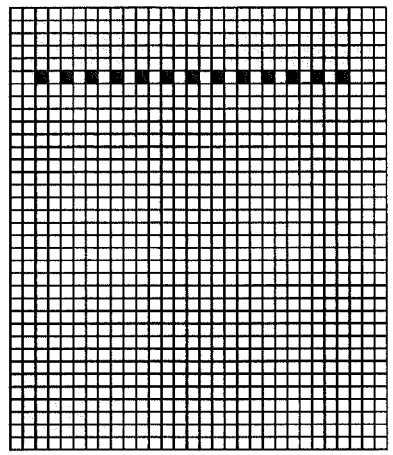
FIGS. 7A to 7E are explanatory views showing the change in the display state in case that the handwriting input is carried out when the input display apparatus is set so as to carry out the thinning and so as not to carry out the pulse width change.

FIG. 7A shows the display state in which the first stroke of the Chinese character "木" is input in handwriting. In FIG. 7A, the data is thinned on alternate pixels. The initial pixel of the first stroke is displayed without thinning the pixel.

Figure 7B:
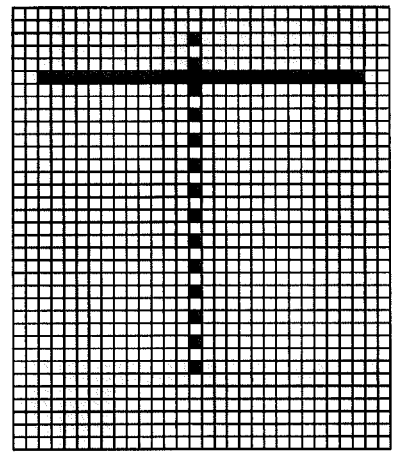

FIG. 7B shows the display state in which the second stroke of the Chinese character "木" is input in handwriting. After the handwriting for inputting the first stroke is terminated (pen separation), the simple display for the first stroke is changed to the normal display in which the first stroke is displayed without thinning the data. The second stroke is displayed in the simple display in which the data is thinned.

Figure 7C:
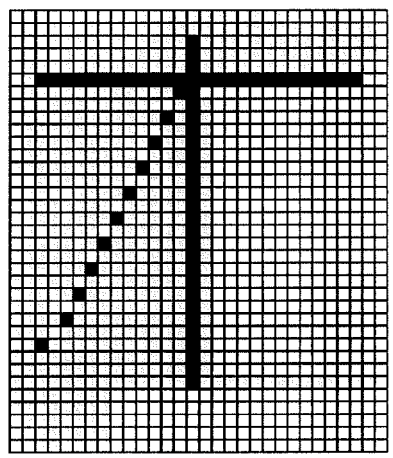

Similarly, FIG. 7C shows the display state in which the third stroke of the Chinese character "木" is input in handwriting. After the handwriting for inputting the second stroke is terminated, the simple display for the second stroke is changed to the normal display in which the second stroke is displayed without thinning the data.

Figure 7D:
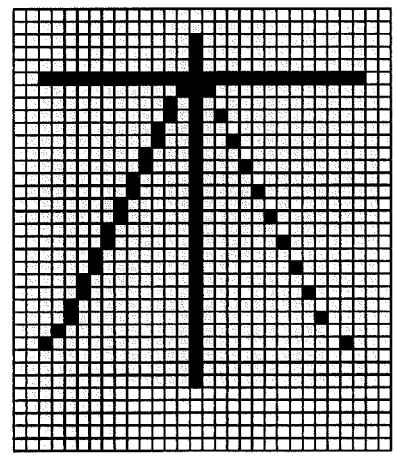

FIG. 7D shows the display state in which the fourth stroke of the Chinese character "木" is input in handwriting. After the handwriting for inputting the third stroke is terminated, the simple display for the third stroke is changed to the normal display in which the third stroke is displayed without thinning the data.

Figure 7E:
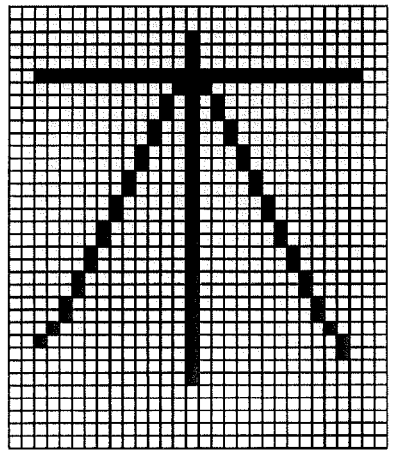

FIG. 7E shows the display state in which the handwriting for inputting the fourth stroke of the Chinese character "木" is terminated. After the handwriting for inputting the fourth stroke is terminated, the simple display for the fourth stroke is changed to the normal display in which the fourth stroke is displayed without thinning the data. Then, the whole of the character "木" is displayed in the normal display.

As described above, by displaying the stroke which is currently input in handwriting in the simple display in which the thinned data is displayed, the number of the pixels to be rewritten is decreased and the display speed becomes high. Further, in the simple display, the delay which is required to display the handwritten stroke is shortened. Therefore, the user can carry out the handwriting input while the user grasps the balance of the whole input contents.

FIGS. 8A to 8E show an example of the change in the display state in case that the handwriting input is carried out when the input display apparatus 10 is set so as to carry out the thinning and the pulse width change. The handwriting termination setting is set to the pen separation. In this example, the data is partially rewritten pixel by pixel. The Chinese character "木" is input in handwriting.

Figure 8A:
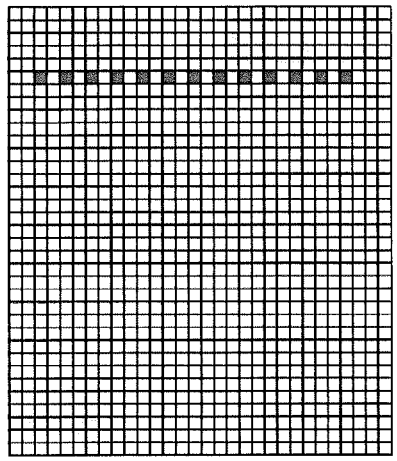
FIGS. 8A to 8E are explanatory views showing the change in the display state in case that the handwriting input is carried out when the input display apparatus is set so as to carry out the thinning and the pulse width change.

FIG. 8A shows the display state in which the first stroke of the Chinese character "木" is input in handwriting. In FIG. 8A, the data is thinned on alternate pixels. Further, the data is displayed at a low density by the writing pulse signal having a shorter pulse width than the writing pulse signal used in the normal display. The initial pixel of the first stroke is displayed without thinning the pixel.

Figure 8B:
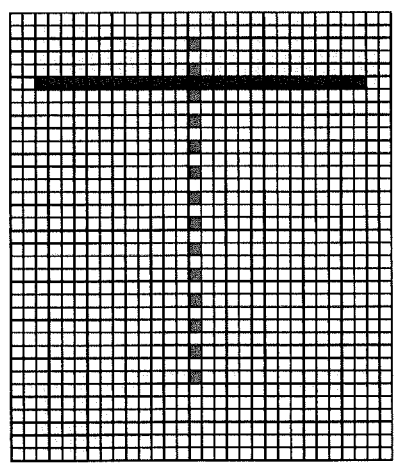

FIG. 8B shows the display state in which the second stroke of the Chinese character "木" is input in handwriting. After the handwriting for inputting the first stroke is terminated (pen separation), the simple display for the first stroke is changed to the normal display in which the first stroke is displayed at the normal density without thinning the data. The second stroke is displayed in the simple display in which the data is displayed at the low density and is thinned.

Figure 8C:
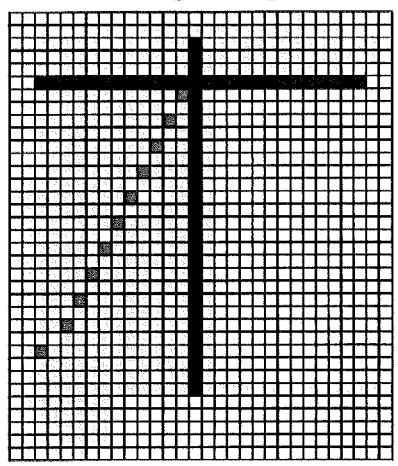

Similarly, FIG. 8C shows the display state in which the third stroke of the Chinese character "木" is input in handwriting. After the handwriting for inputting the second stroke is terminated, the simple display for the second stroke is changed to the normal display in which the second stroke is displayed at the normal density without thinning the data. The third stroke is displayed in the simple display in which the data is displayed at the low density and is thinned.

Figure 8D:
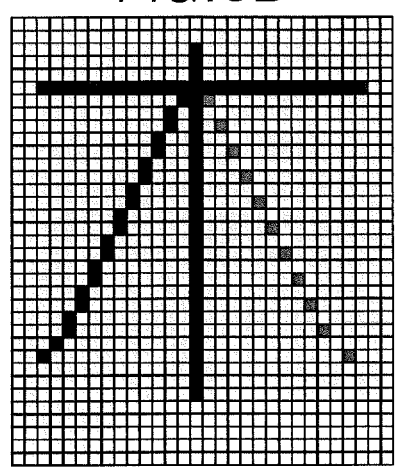

FIG. 8D shows the display state in which the fourth stroke of the Chinese character "木" is input in handwriting. After the handwriting for inputting the third stroke is terminated, the simple display for the third stroke is changed to the normal display in which the third stroke is displayed at the normal density without thinning the data. The fourth stroke is displayed in the simple display in which the data is displayed at the low density and is thinned.

Figure 8E:
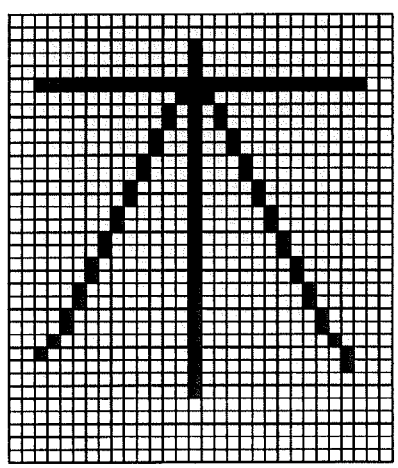

FIG. 8E shows the display state in which the handwriting for inputting the fourth stroke of the Chinese character "木" is terminated. After the handwriting for inputting the fourth stroke is terminated, the simple display for the fourth stroke is changed to the normal display in which the fourth stroke is displayed at the normal density without thinning the data. Then, the whole of the character "木" is displayed in the normal display.

As described above, by displaying the stroke which is currently input in handwriting in the simple display in which the thinned data is displayed at the low density, the number of the pixels to be rewritten is decreased and the rewriting time per one pixel is shortened. As a result, the display speed becomes higher. Further, in the simple display, the delay which is required to display the handwritten stroke is shortened. Therefore, the user can carry out the handwriting input while the user grasps the balance of the whole input contents. Further, even though the thinned data is displayed at the low density, the user can recognize the schematic shape of the stroke.

FIGS. 9A to 9F show an example of the change in the display state in case that the handwriting input is carried out when the input display apparatus 10 is set so as to carry out the thinning and so as not to carry out the pulse width change. Further, FIGS. 9A to 9F show the case in which the handwriting input for inputting the next stroke is received before the simple display is changed to the normal display. The handwriting termination setting is set to the pen separation. In this example, the data is partially rewritten pixel by pixel. The Chinese character "木" is input in handwriting.

Figure 9A:
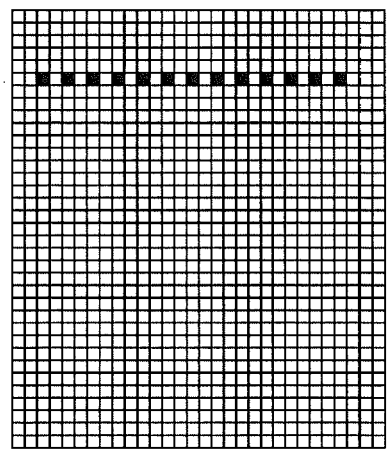
FIGS. 9A to 9F are explanatory views showing the change in the display state in case that the handwriting input is carried out when the input display apparatus is set so as to carry out the thinning and so as not to carry out the pulse width change in the simple display priority mode.
Figure 9B:
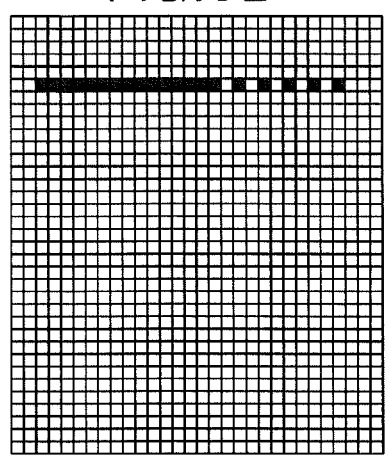

FIG. 9A shows the display state in which the first stroke of the Chinese character "木" is input in handwriting. In FIG. 9A, the data is thinned on alternate pixels. The initial pixel of the first stroke is displayed without thinning the pixel. FIG. 9B shows the display state in which after the handwriting for inputting the first stroke of the Chinese character "木" is terminated, the first stroke is displayed by changing the simple display to the normal display partway.

Figure 9C:
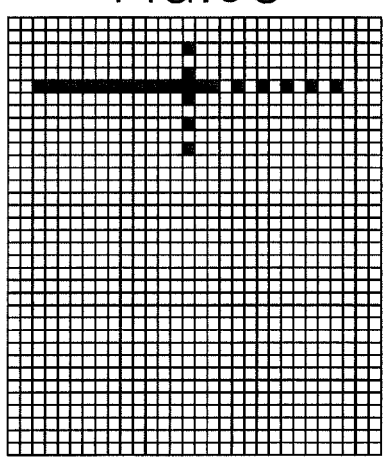

FIG. 9C shows the display state in which the handwriting for inputting the second stroke of the Chinese character "木" is started immediately after the state shown in FIG. 9B. The operation for changing the simple display for the first stroke to the normal display is temporarily stopped, and the simple display for the second stroke is preferentially carried out.

Figure 9D:
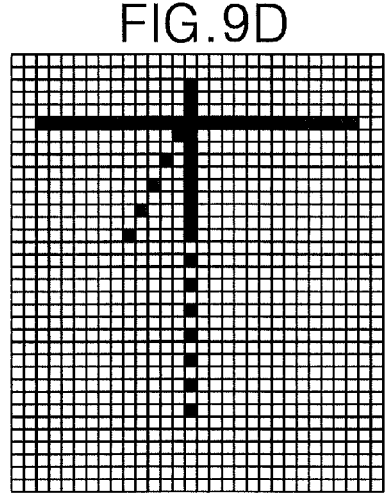

FIG. 9D shows the display state in which the handwriting for inputting the third stroke of the Chinese character "木" is carried out halfway. The operation for changing the simple display for the first stroke to the normal display is finished since the handwriting for inputting the second stroke is terminated until the handwriting for inputting the third stroke is started. Further, the simple display for the second stroke is changed to the normal display partway. That is, in this example, because the handwriting for inputting the third stroke is started when the simple display for the second stroke is changed to the normal display partway, the operation for changing the simple display for the second stroke to the normal display is temporarily stopped, and the simple display for the third stroke is preferentially started.

Figure 9E:
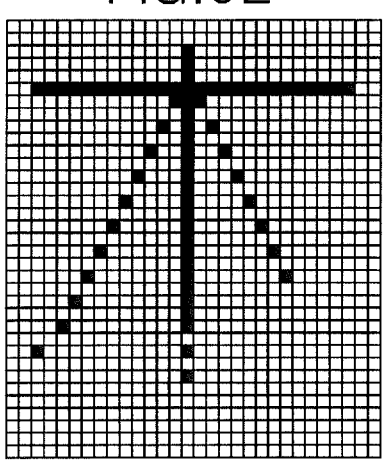

FIG. 9E shows the display state in which the handwriting for inputting the fourth stroke of the Chinese character "木" is carried out halfway. The operation for changing the simple display for the second stroke to the normal display has progressed to a certain degree and is temporarily stopped again since the handwriting for inputting the third stroke is terminated until the handwriting for inputting the fourth stroke is started. The third stroke is displayed without changing the simple display to the normal display, and the simple display for the fourth stroke is preferentially carried out.

Figure 9F:
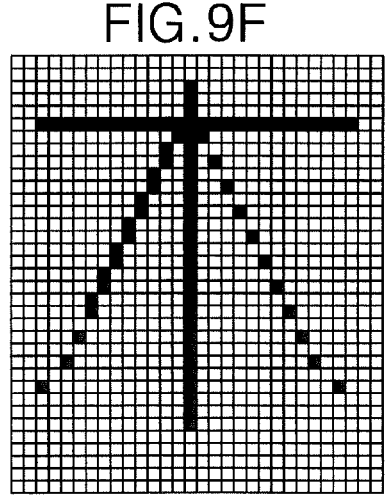

FIG. 9F shows the display state in which after the handwriting for inputting the fourth stroke of the Chinese character "木" is terminated, the simple display for the third stroke is changed to the normal display partway. Then, the operation for changing the simple display for the third stroke to the normal display is carried out. Further, the operation for changing the simple display for the fourth stroke to the normal display is carried out in order.

As described above, in case that the handwriting input for inputting the next stroke is received before the operation for changing the simple display for the previous stroke to the normal display is finished, the simple display for the next stroke is carried out prior to the above operation for changing the simple display to the normal display. Therefore, it is possible to input the strokes in sequence while the user confirms the handwritten contents in the simple display.

As described above, the embodiment is explained by using the drawings. However, in the present invention, the concrete configuration is not limited to the above embodiment. In the present invention, various modifications of the above embodiment or the addition of various functions or the like to the embodiment can be carried out without departing from the gist of the invention.

In the embodiment, in case that the data is thinned in the simple display, the initial pixel of the stroke is not thinned. Preferably, also the end pixel of the stroke is not thinned.

Further, an optional thinning method in which the data is thinned while the schematic shape of the stroke which is input in handwriting is retained, can be applied to the above embodiment. For example incase that the curve line is thinned, preferably, a thinning method in which the pixel of the inflection point or the like is not thinned, is applied to the above embodiment.

In the embodiment, after the handwriting for inputting the stroke is terminated, the operation for changing the simple display for the above stroke to the normal display is carried out. However, incase that because the speed of the handwriting input for inputting the stroke is slow, the stroke is displayed in the simple display before the above handwriting input is terminated and the time required for carrying out the simple display for the stroke is shorter than the time for carrying out the handwriting input, preferably, even though the handwriting input for inputting the stroke has not been terminated, the operation for changing the simple display for the above stroke to the normal display is started.

One of the objects of the above embodiment is to provide an input display apparatus, a tangible computer-readable recording medium and an input display method, which can recognize the handwritten contents by a small delay during the handwriting input.

In the above embodiment, the stroke which is currently input in handwriting, is displayed in the simple display in which the delay time required to display the input stroke is short as compared with the normal display. An optional method for carrying out the simple display can be used. By displaying the stroke which is currently input in the simple display, it is possible to display the handwritten contents so as to visually recognize the contents by a small delay during the handwriting input.

In the embodiment, the stroke which is currently input is tentatively displayed in the simple display and then the simple display for this stroke is changed to the normal display. For example, after the handwriting for inputting the stroke is terminated, the simple display is changed to the normal display. Alternatively, in case that the processing time for displaying the stroke in the simple display is shortened, the simple display is changed to the normal display by using the time obtained by shortening the processing time.

In the embodiment, by thinning display data of the input stroke, the part (pixels or lines) to be rewritten is reduced. Therefore, the time required to display the stroke in the simple display is shortened.

In the embodiment, the initial point of the stroke is prevented from being unclear due to the thinning of the display data.

In the embodiment, in case that the stroke is extended in the same direction, such as a straight line, or the direction of the stroke is changed at the same rate, such as a circle, even though the data is thinned at a high thinning rate, the user can recognize the schematic shape of the stroke. Therefore, in this case, by increasing the thinning rate, the delay required to display the stroke is shortened.

In the embodiment, in proportion as the handwriting input speed is high, the display speed is not adjusted to the handwriting speed. Therefore, it is preferable to adjust the display speed to the handwriting speed by increasing the thinning rate. However, when the thinning rate is excessively increased, it is difficult to recognize the shape of the stroke. Therefore, in proportion as the handwriting input speed is high, the thinning rate is increased so as not to exceed the predetermined upper limit.

In the embodiment, in case that a bold line is displayed, because the number of the pixels to be rewritten is large as compared with a narrow line, the delay required to display the bold line becomes long. Therefore, by narrowing the line width and reducing the number of the pixels to be rewritten, the response time for displaying the stroke is improved. Even thought the line width is narrowed in the simple display, the schematic shape of the stroke can be recognized. Therefore, the problem is not caused.

In the embodiment, because the time for displaying a color stroke is longer than the time for displaying a stroke in monochrome, by displaying the stroke which is input in color, in monochrome in the simple display, the response for displaying this stroke is improved.

In the embodiment, by lowering the density of the displayed stroke, the time for rewriting the displayed stroke is shortened. Specifically, when the voltage applying time is shortened, the density of the displayed stroke becomes low (the contrast is low). Therefore, by displaying the stroke at a low density, the voltage applying time is shortened. As a result, the response for displaying the stroke is improved.

In the embodiment, in the simple display, the data is thinned by lengthening the sampling cycle at positions of the handwriting input as compared with the normal display.

According to the above input display apparatus, the tangible computer-readable recording medium and the input display method, it is possible to display the handwritten contents so as to visually recognize the contents by a small delay during the handwriting input.

What is claimed is:

1. An input display apparatus comprising:
   a handwriting input unit to receive a handwriting input;
   a particle migration type of display unit to enable display contents to be partially rewritten; and
   a control unit configured to control a display operation of the display unit, for displaying each stroke which is input via the handwriting input unit;
   wherein the control unit is configured to control the display unit so as to display a currently input stroke which is currently input via the handwriting input unit, in a simple display in which a delay required to display the currently input stroke is shortened as compared with a normal display by thinning display data of the currently input stroke.

2. The input display apparatus of claim 1, wherein after the currently input stroke is displayed in the simple display, the control unit changes the simple display to the normal display.

3. The input display apparatus of claim 1, wherein the control unit controls the display unit so as to display the currently input stroke without thinning an initial pixel of the currently input stroke.

4. The input display apparatus of claim 1, wherein the control unit increases a thinning rate in proportion as a change rate of a direction of the currently input stroke is small.

5. The input display apparatus of claim 1, wherein the control unit increases a thinning rate so as not to exceed a predetermined upper limit of the thinning rate, in proportion as an input speed of the currently input stroke is high.

6. The input display apparatus of claim 1, wherein in the simple display, in case that a line width of the currently input stroke is not less than the predetermined number of pixels, the control unit controls the display unit so as to display the currently input stroke by narrowing the line width of the currently input stroke.

7. The input display apparatus of claim 1, wherein in the simple display, the control unit controls the display unit so as to display the currently input stroke which is currently input in color, in monochrome.

8. The input display apparatus of claim 1, wherein in the simple display, the control unit controls the display unit so as to display the currently input stroke which is currently input via the handwriting input unit, at a low density as compared with the normal display.

9. The input display apparatus of claim 1, wherein the display data of the currently input stroke is thinned by changing a sampling cycle at positions of the handwriting input.

10. A tangible computer-readable recording medium storing a program, wherein the program causes an input display apparatus comprising a handwriting input unit to receive a handwriting input; and a particle migration type of display unit to enable display contents to be partially rewritten, to execute:
    displaying a currently input stroke which is currently input via the handwriting input unit, on the display unit in a simple display in which a delay required to display the currently input stroke is shortened as compared with a normal display by thinning display data of the currently input stroke.

11. The tangible computer-readable recording medium of claim 10, wherein the program causes the input display apparatus to further execute: changing the simple display to the normal display after the currently input stroke is displayed in the simple display.

12. The tangible computer-readable recording medium of claim 10, wherein the program causes the input display apparatus to further execute: displaying the currently input stroke on the display unit without thinning an initial pixel of the currently input stroke.

13. The tangible computer-readable recording medium of claim 10, wherein the program causes the input display apparatus to further execute: increasing a thinning rate in proportion as a change rate of a direction of the currently input stroke is small.

14. The tangible computer-readable recording medium of claim 10, wherein the program causes the input display apparatus to further execute: increasing a thinning rate so as not to exceed a predetermined upper limit of the thinning rate, in proportion as an input speed of the currently input stroke is high.

15. The tangible computer-readable recording medium of claim 10, wherein the program causes the input display apparatus to further execute: displaying the currently input stroke on the display unit in the simple display by narrowing a line width of the currently input stroke, in case that the line width of the currently input stroke is not less than the predetermined number of pixels.

16. The tangible computer-readable recording medium of claim 10, wherein the program causes the input display apparatus to further execute: displaying the currently input stroke which is currently input in color, in monochrome on the display unit in the simple display.

17. The tangible computer-readable recording medium of claim 10, wherein the program causes the input display apparatus to further execute: displaying the currently input stroke which is currently input via the handwriting input unit, on the display unit in the simple display at a low density as compared with the normal display.

18. The tangible computer-readable recording medium of claim 10, wherein the program causes the input display apparatus to further execute: thinning the display data of the currently input stroke by changing a sampling cycle at positions of the handwriting input.

19. An input display method for displaying each stroke of a handwriting input by using an input display apparatus which comprises a handwriting input unit to receive the handwriting input; and a particle migration type of display unit to enable display contents to be partially rewritten, the method comprising:
   displaying a currently input stroke which is currently input via the handwriting input unit, on the display unit in a simple display in which a delay required to display the currently input stroke is shortened as compared with a normal display by thinning display data of the currently input stroke.

20. An input display apparatus comprising:
   a handwriting input unit to receive a handwriting input;
   a particle migration type of display unit to enable display contents to be partially rewritten; and
   a control unit configured to control a display operation of the display unit, for displaying each stroke which is input via the handwriting input unit;
   wherein the control unit is configured to control the display unit so as to display a currently input stroke which is currently input via the handwriting input unit, in a simple display in which a delay required to display the currently input stroke is shortened as compared with a normal display; and
   wherein in the simple display, in case that a line width of the currently input stroke is not less than the predetermined number of pixels, the control unit controls the display unit so as to display the currently input stroke by narrowing the line width of the currently input stroke.

21. A tangible computer-readable recording medium storing a program, wherein the program causes an input display apparatus comprising a handwriting input unit to receive a handwriting input; and a particle migration type of display unit to enable display contents to be partially rewritten, to execute:
   displaying a currently input stroke which is currently input via the handwriting input unit, on the display unit in a simple display in which a delay required to display the currently input stroke is shortened as compared with a normal display; and
   displaying the currently input stroke on the display unit in the simple display by narrowing a line width of the currently input stroke, in case that the line width of the currently input stroke is not less than the predetermined number of pixels.

* * * * *